J. A. EBERLE.
GRASS CATCHER.
APPLICATION FILED AUG. 29, 1910.
991,773.
Patented May 9, 1911.
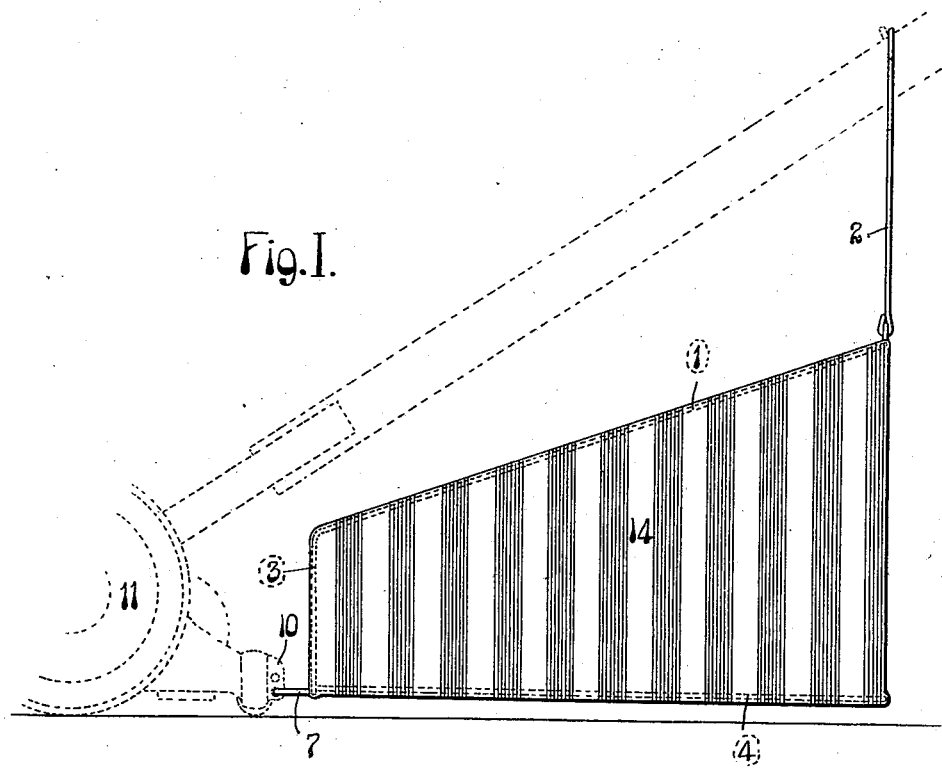
Fig. I.
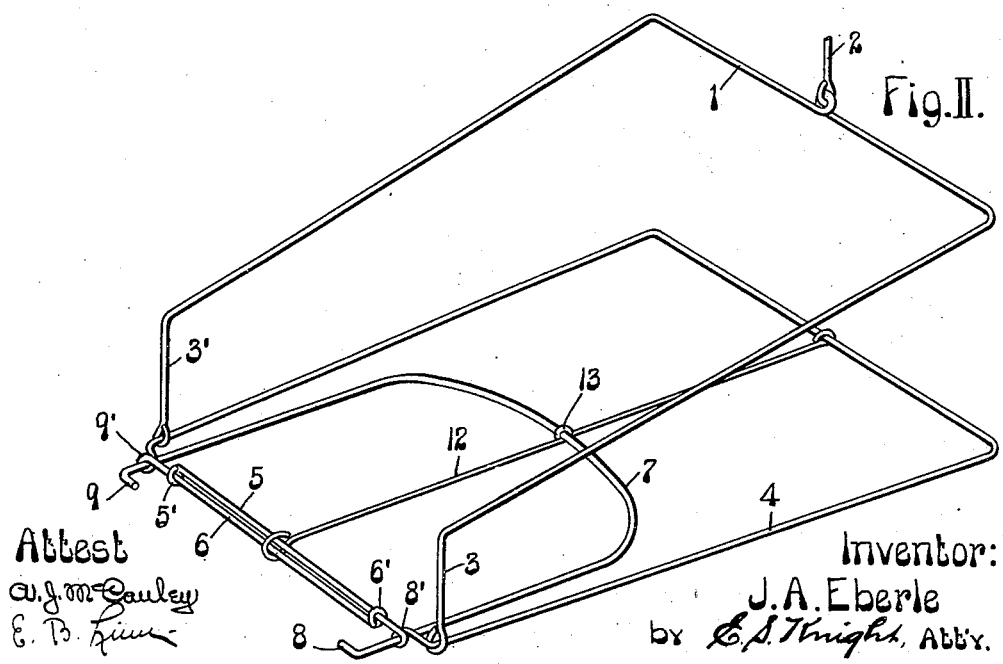
Fig. II.
Attest
a. J. McCauley
E. B. Zinn
Inventor:
J. A. Eberle
by E. S. Knight, Atty.

UNITED STATES PATENT OFFICE.

JOHN A. EBERLE, OF ST. LOUIS, MISSOURI, ASSIGNOR TO THE PERFECTION MANUFACTURING COMPANY, OF ST. LOUIS, MISSOURI, A CORPORATION.

GRASS-CATCHER.

991,773. Specification of Letters Patent. Patented May 9, 1911.

Application filed August 29, 1910. Serial No. 579,436.

*To all whom it may concern:*

Be it known that I, JOHN A. EBERLE, a citizen of the United States of America, residing in the city of St. Louis and State of Missouri, have invented certain new and useful Improvements in Grass-Catchers, of which the following is a full, clear, and exact description, reference being had to the accompanying drawings, forming part of this specification.

My invention relates to an improvement in grass catchers and has for its object to provide a simple spring-controlled adjustable catcher that may be readily folded for shipping or storing purposes.

Figure I is a side elevation of my grass catcher mounted upon a lawn mower, a part only of which is shown in dotted outlines. Fig. II is a perspective view of the frame work of my grass catcher.

In the accompanying drawings: 1 designates an upper frame section having a hanger 2 attached thereto. The front terminals of the upper frame section are turned downwardly, as seen at 3 and 3', and looped about a lower frame section 4. Transverse front arms 5 and 6 of the lower frame section 4 are provided with loops 5' and 6'. one of them passing around the arm 5 and the other one passing around the arm 6, to provide a sliding connection so that the width between the forward ends of the sides of the catcher frame may be varied.

7 designates a spring bow of substantially U-shape which is normally in a contracted condition indicating the limit of contraction of the width of the catcher between the forward ends of the sides thereof. The spring bow 7 terminates at its forward ends in two inturned fingers 8 and 9 adapted to seat in perforations provided in a pair of plates 10 (only one being shown) secured to the frame of a lawn mower 11. The arms of the spring 7 are secured near their forward ends to the arms 5 and 6 of the bottom frame section 4 by being passed through loops 8' and 9' in said arms 5 and 6.

12 designates a brace rod loosely looped about the arms 5 and 6 at its forward end and connected to the transverse rear member of the bottom frame section 4. The spring bow 7 is secured to said brace rod by a loop 13 therein.

14 is a fabric body secured to the upper and lower frame sections 3 and 4 to provide sides, a back and a bottom to complete the grass catcher.

I claim:

1. A grass catcher comprising an expansible and contractible frame, and a spring bow connected to said frame to yieldingly maintain it in contracted condition; said spring bow being provided with means integral therewith for attaching the catcher to a lawn mower.

2. A grass catcher, comprising an expansible and contractible frame having side members and forward arms slidably fitted to each other, the said arms being provided with loops, and a spring bow connected to said frame and having means integral therewith for attaching the catcher to a lawn mower.

3. A grass catcher, comprising an expansible and contractible frame, having side arms and forward arms slidably fitted to each other, the said forward arms being provided with loops, a brace rod extending from said forward arms to the back of said frame, and a spring bow connected to said brace rod and mounted in said loops and having means integral therewith for attaching the catcher to a lawn mower.

JOHN A EBERLE.

In the presence of—
M. C. HAMMON,
E. B. LINN.

Copies of this patent may be obtained for five cents each, by addressing the "Commissioner of Patents, Washington, D. C."